US011129335B2

(12) United States Patent
Singh et al.

(10) Patent No.: US 11,129,335 B2
(45) Date of Patent: Sep. 28, 2021

(54) SHAFT SHIELD FOR ROTARY CONVEYOR

(71) Applicant: CNH Industrial America LLC, New Holland, PA (US)

(72) Inventors: Chandrashekhar Singh, Lancaster, PA (US); John R. McClure, New Holland, PA (US); Todd Hertzler, Gordonville, PA (US)

(73) Assignee: CNH Industrial America LLC, New Holland, PA (US)

( * ) Notice: Subject to any disclaimer, the term of this patent is extended or adjusted under 35 U.S.C. 154(b) by 169 days.

(21) Appl. No.: 16/417,933

(22) Filed: May 21, 2019

(65) Prior Publication Data

US 2020/0367438 A1  Nov. 26, 2020

(51) Int. Cl.
| | |
|---|---|
| *A01F 15/10* | (2006.01) |
| *B65G 33/24* | (2006.01) |
| *B65G 33/14* | (2006.01) |
| *A01D 89/00* | (2006.01) |
| *A01D 90/04* | (2006.01) |

(52) U.S. Cl.
CPC .............. *A01F 15/10* (2013.01); *B65G 33/14* (2013.01); *B65G 33/24* (2013.01); *A01D 89/002* (2013.01); *A01D 89/004* (2013.01); *A01D 89/008* (2013.01); *A01D 90/04* (2013.01); *A01F 2015/108* (2013.01)

(58) Field of Classification Search
CPC ... A01F 15/10; A01F 2015/108; B65G 33/24; B65G 33/14; A01D 89/004; A01D 90/04; A01D 89/002; A01D 89/008
See application file for complete search history.

(56) References Cited

U.S. PATENT DOCUMENTS

| | | | | |
|---|---|---|---|---|
| 4,676,380 A | * | 6/1987 | Dahlby | B07B 13/006 209/616 |
| 4,752,009 A | * | 6/1988 | Dahlby | B07B 13/006 209/616 |
| 4,854,454 A | * | 8/1989 | Dahlby | B07B 13/006 209/616 |
| 6,279,304 B1 | * | 8/2001 | Anstey | A01F 15/106 198/676 |
| 6,314,708 B1 | * | 11/2001 | Engel | A01F 15/10 198/497 |
| D470,514 S | * | 2/2003 | Engel | D15/28 |
| 6,526,736 B1 | | 3/2003 | Anstey | |
| 6,988,354 B1 | | 1/2006 | Pargmann et al. | |
| 8,959,883 B2 | | 2/2015 | McClure et al. | |
| D746,876 S | * | 1/2016 | McClure | D15/28 |
| 9,578,809 B2 | * | 2/2017 | Reiter | A01D 89/004 |
| 10,039,237 B2 | * | 8/2018 | Smith | A01F 15/106 |

(Continued)

*Primary Examiner* — Arpad Fabian-Kovacs
(74) *Attorney, Agent, or Firm* — Peter Zacharias; Patrick Sheldrake

(57) ABSTRACT

A shield to prevent crop material from wrapping around the shaft of a rotary conveyor of a harvester, such as a baler, includes a body. The body is positioned between a stripper finger and a shaft of the rotary conveyor and has an end surface facing the shaft. A lug is positioned at the opposite end of the body from the end surface and is attached to the housing of the rotary conveyor. The body has opposite side surfaces positioned in spaced relation at a distance substantially equal to the width of the separation fingers of the rotary conveyor.

42 Claims, 5 Drawing Sheets

(56) References Cited

U.S. PATENT DOCUMENTS

2006/0005522 A1\* 1/2006 Pargmann .............. A01D 90/04
 56/341
2014/0109542 A1\* 4/2014 McClure ................. A01F 15/10
 56/341
2016/0366827 A1 12/2016 Smith et al.

\* cited by examiner

SHAFT SHIELD FOR ROTARY CONVEYOR

FIELD OF THE INVENTION

This invention relates to rotary conveyors for harvesters.

BACKGROUND

Harvesters, such as balers, which use a rotary conveyor to transfer crop material from the pickup assembly to the bale chamber may encounter one or more problems when stripper fingers of the rotary conveyor fail to separate the crop material from the rotating tines of the conveyor. This may occur when the crop material is sticky or limp, for example. The crop material may fold around the tines and be drawn between the stripper fingers and accumulate, possibly causing the stripper fingers to spread apart. Crop material may also wrap around the rotating shaft to which the tines are attached. This phenomenon is disadvantageous, as such an accumulation of crop material can increase the resistance to shaft rotation, resulting in increased strain on the conveyor parts as well as drive shafts powering the harvester. The increased strain is known to cause premature component failure. There is clearly an opportunity to improve the performance and increase the time between failures for harvesters by avoiding fouling of rotary conveyors by crop material.

SUMMARY

The invention concerns a shield mountable on a rotary conveyor and positionable between a stripper finger and a shaft thereof. In one example embodiment the shield comprises a body having first and second ends oppositely disposed. An end surface is positioned at the first end of the body. The end surface is positionable in facing relation to the shaft. A lug is positioned at the second end of the body. The lug is attachable to the rotary conveyor for retention of the shield thereto. First and second side surfaces are positioned on opposite sides of the body and extend between the end surface and the lug.

In an example embodiment the lug is positionable between the stripper finger and the rotary conveyor. Further by way of example the end surface has a concave radius of curvature facing the shaft. In an example embodiment the lug extends substantially perpendicularly to the end surface. By way of example the lug defines at least one hole adapted to receive a locating pin extending from one of the stripper fingers or the portion of the rotary conveyor. In an example the lug defines at least one hole adapted to receive a fastener for attaching the body to the portion of the rotary conveyor.

In an example embodiment the lug may further comprise first and second skirts positioned in spaced relation on opposite sides of the lug. The first and second skirts extend transversely to the lug. Further by way of example the first and second side surfaces are spaced apart from one another a distance that is substantially equal to a width of the stripper finger. In an example embodiment the first and second side surfaces have respective first and second edges facing the stripper finger. The first and second edges each have a shape matched to a shape of the stripper finger. In a specific example, the shapes of the first and second edges comprise a convex curvature. In an example embodiment the first and second sides may further comprise respective first and second ventral edges positionable in facing relation with an end of the stripper finger. In a specific example the first and second ventral edges have a shape matched to a shape of the end of the stripper finger. In a specific example embodiment the shape of the first and second ventral edges comprises a concave curvature.

The invention further encompasses a rotary conveyor. In an example embodiment the rotary conveyor comprises a housing. A shaft is mounted on the housing for rotation about a longitudinal axis of the shaft. A plurality of tines are mounted on the shaft in spaced relation to one another. A plurality of stripper fingers are mounted on the housing in spaced relation to one another. Each tine is positioned between two stripper fingers. At least one shield is positioned between one of the stripper fingers and the shaft. By way of example the at least one shield comprises a body having first and second ends oppositely disposed. An end surface is positioned at the first end of the body. The end surface faces the shaft. A lug is positioned at the second end of the body. The lug is attached to the frame. First and second side surfaces are positioned on opposite sides of the body and extend between the end surface and the lug.

In an example embodiment the lug is positioned between the one stripper finger and the frame. By way of example the end surface may have a concave radius of curvature facing the shaft. Further by way of example the lug may extend substantially perpendicularly to the end surface. In an example embodiment the lug defines at least one hole adapted to receive a locating pin extending from the one stripper finger or the frame. In a further example the lug defines at least one hole adapted to receive a fastener for attaching the body to the frame. By way of example the lug may further comprise first and second skirts positioned in spaced relation on opposite sides of the lug. The first and second skirts extend transversely to the lug in this example. In a specific example the first and second side surfaces are spaced apart from one another a distance that is substantially equal to a width of the one stripper finger. In an example embodiment the first and second side surfaces have respective first and second edges facing the one stripper finger. Each first and second edge may have a shape matched to a shape of the one stripper finger. In an example embodiment the shapes of the first and second edges comprise a convex curvature. Further by way of example the first and second sides may comprise respective first and second ventral edges positioned in facing relation with an end of the one stripper finger. In a specific example the first and second ventral edges have a shape matched to a shape of the end of the one stripper finger. By way of example the shape of the first and second ventral edges may comprise a concave curvature. An example rotary conveyor according to the invention may further comprise a plurality of the shields, with each shield being positioned between a respective one of the stripper fingers and the shaft.

The invention also encompasses a harvester. In an example embodiment the harvester comprises a rotary conveyor. By way of example the conveyor comprises a housing. A shaft is mounted on the housing for rotation about a longitudinal axis of the shaft. A plurality of tines are mounted on the shaft in spaced relation to one another. A plurality of stripper fingers are mounted on the housing in spaced relation to one another. Each tine is positioned between two stripper fingers. At least one shield is positioned between one of the stripper fingers and the shaft. In an example embodiment the at least one shield comprises a body having first and second ends oppositely disposed. An end surface is positioned at the first end of the body. The end surface faces the shaft. A lug is positioned at the second end of the body. The lug is attached to the frame. First and second side surfaces are positioned on opposite sides of the body and extend between the end surface and the lug. In a specific example embodiment the lug is positioned between the one stripper finger and the frame. In another example embodiment the end surface has a concave radius of curvature facing the shaft. Further by way of example the lug may extend substantially perpendicularly to the end surface. In an example embodiment the lug defines at least one hole adapted to receive a locating pin extending from the one stripper finger or the frame. In a further example embodiment the lug defines at least one hole adapted to receive a fastener for attaching the body to the frame. By way of example the lug may further comprise first and second skirts positioned in spaced relation on opposite sides of the lug. The first and second skirts extend transversely to the lug in this example.

In an example embodiment the first and second side surfaces are spaced apart from one another a distance that is substantially equal to a width of the one stripper finger. Further by way of example the first and second side surfaces have respective first and second edges facing the one stripper finger. The first and second edges each have a shape matched to a shape of the one stripper finger in an example embodiment. In a specific example the shapes of the first and second edges comprise a convex curvature. Further by way of example the first and second sides may comprise respective first and second ventral edges positioned in facing relation with an end of the one stripper finger. By way of example, the first and second ventral edges may have a shape matched to a shape of the end of the one stripper finger. In a specific example the shape of the first and second ventral edges comprises a concave curvature. In an example harvester according to the invention a plurality of the shields are positioned between a respective one of the stripper fingers and the shaft. In an example embodiment the harvester comprises a baler.

DETAILED DESCRIPTION

Figure 1:
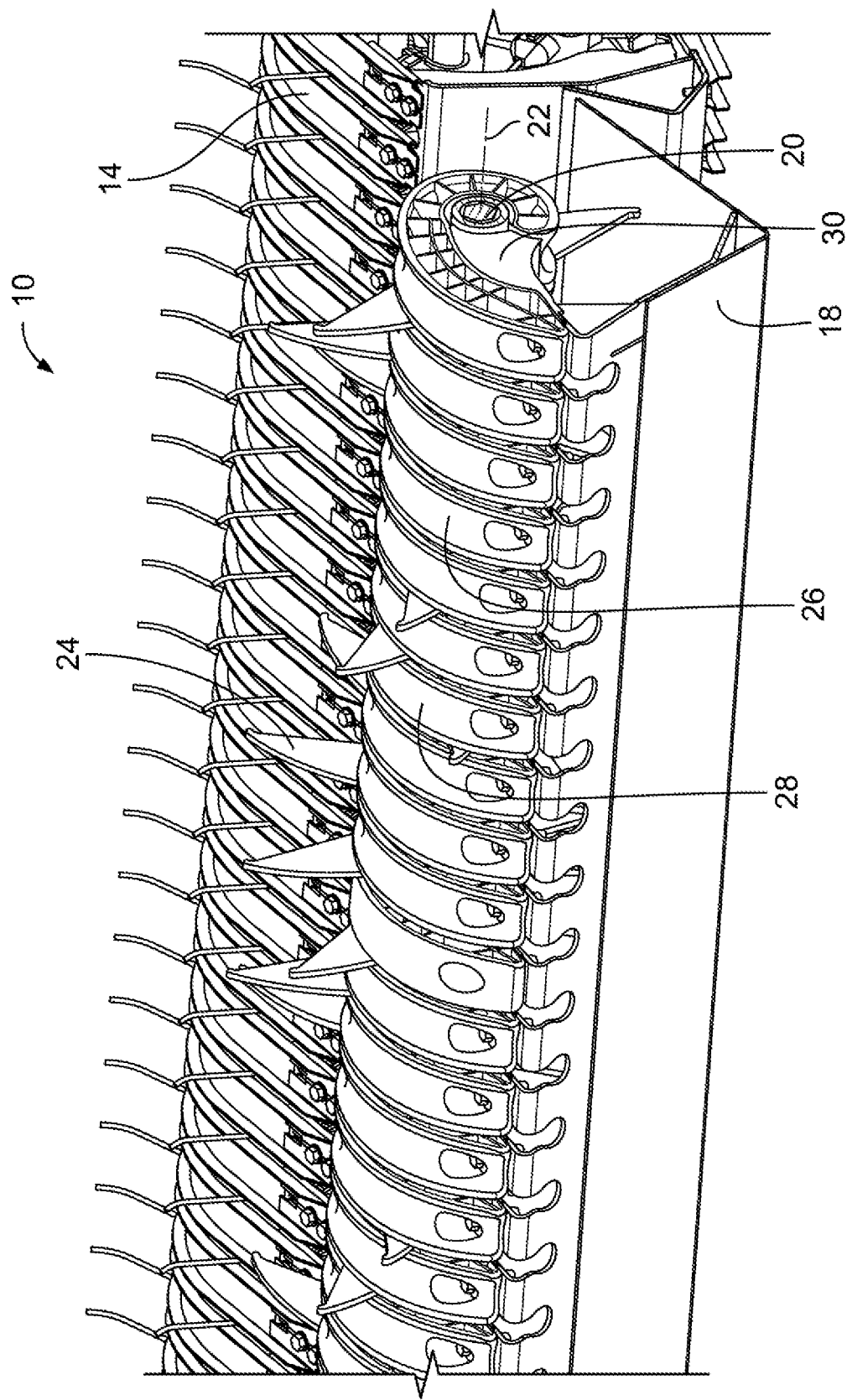
FIG. 1 shows an isometric view of a portion of an example rotary conveyor according to the invention.
Figure 2:
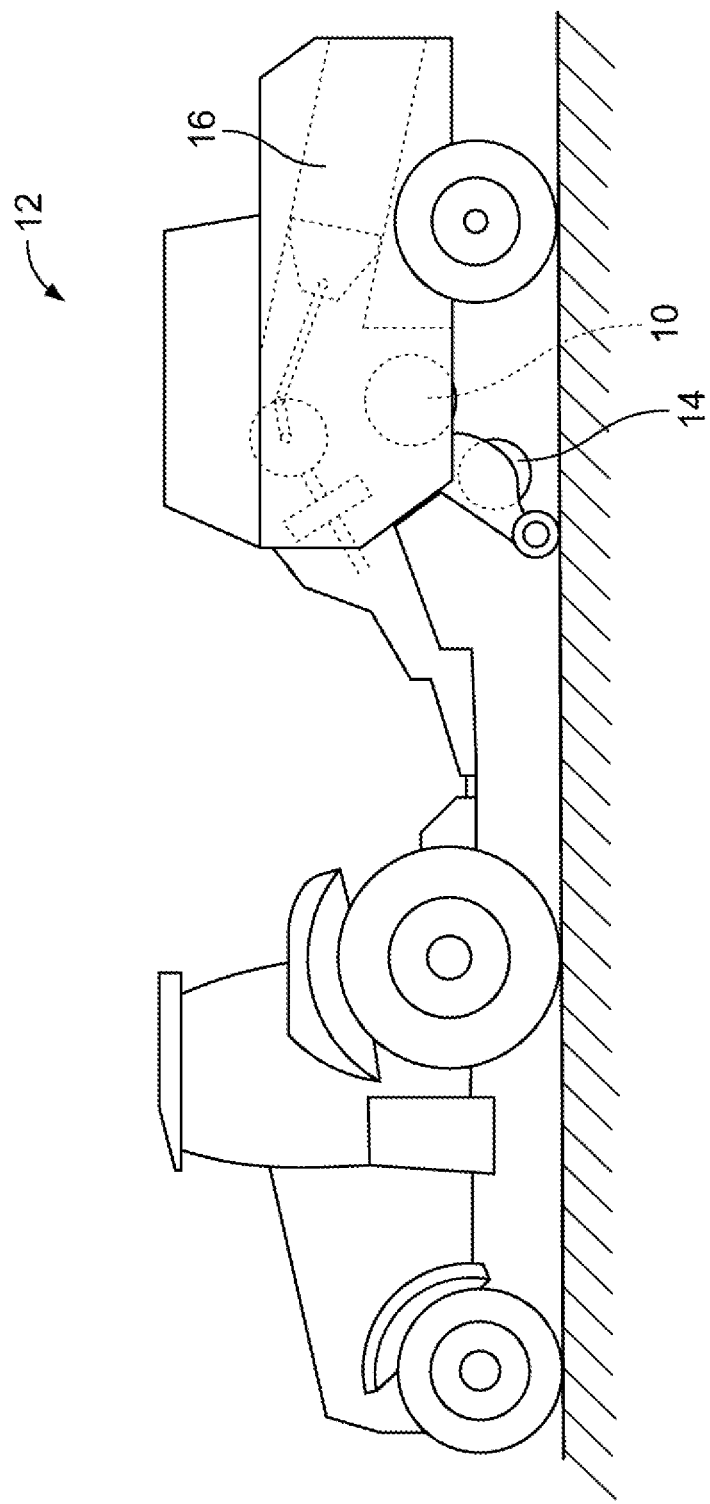
FIG. 2 shows a side view of an example harvester according to the invention.

FIG. 1 shows an example rotary conveyor 10 as might be used in a harvester, such as a baler 12, shown in FIG. 2. Conveyor 10 works in conjunction with a pickup assembly 14 and transfers crop material picked up by the tines of the pickup assembly to the baler chamber 16. Conveyor 10 comprises a housing 18 on which a shaft 20 is mounted. Shaft 20 is rotatable about its longitudinal axis 22. A plurality of tines 24 are mounted on the shaft 20. Tines 24 are arranged in spaced apart relation to one another along shaft 20 and project radially outwardly from the shaft. As shaft 20 rotates each tine 24 passes between two stripper fingers 26. Stripper fingers 26 are mounted on the housing 18 and have an external surface profile 28 which strips the crop material from the tines 24 as it is transferred to the baler chamber 16.

Figure 3:
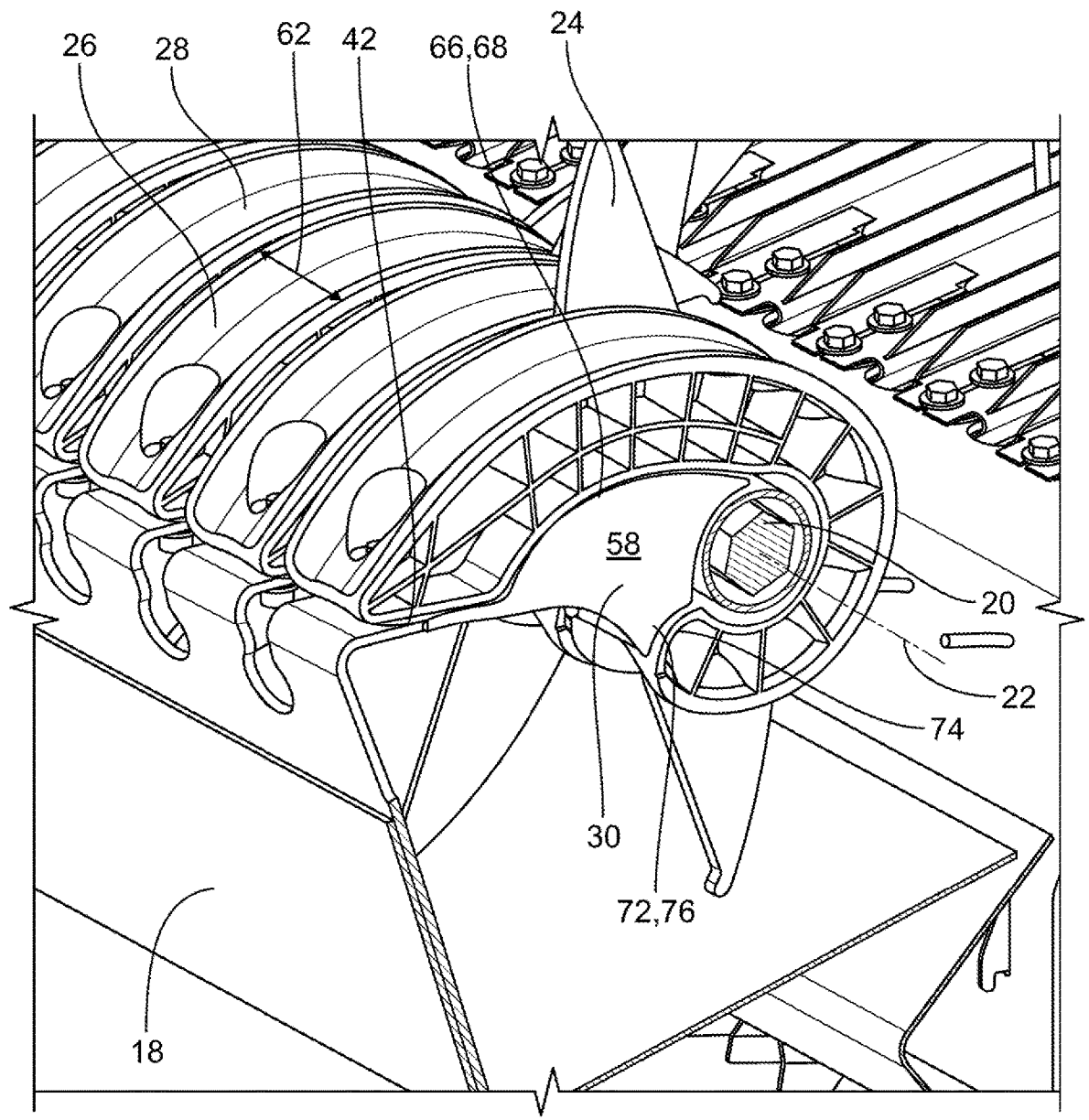
FIG. 3 shows an isometric view of a portion of the rotary conveyor of FIG. 1 on an enlarged scale.
Figure 4:
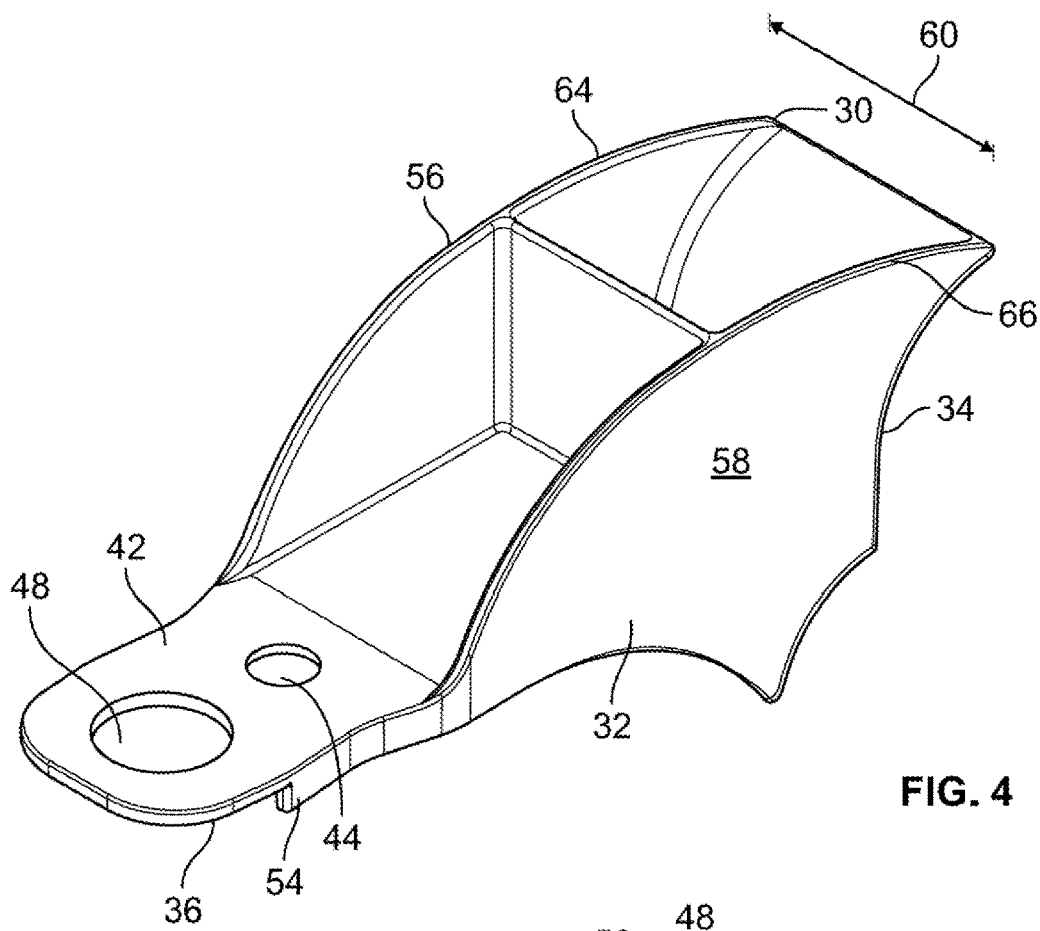
FIGS. 4 and 5 are isometric views of an example shield according to the invention.
Figure 5:
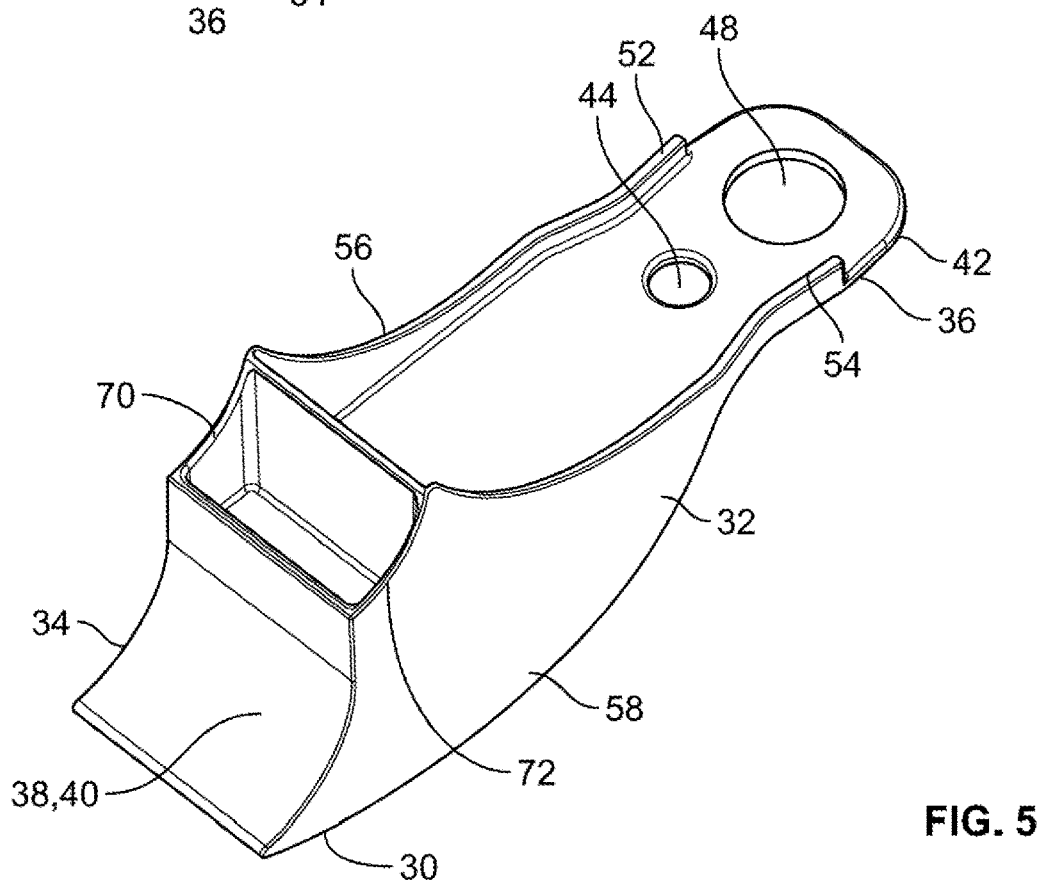

As shown by way of example in FIG. 3, one or more shields 30 are mounted on housing 18 between stripper fingers 26 and the shaft 20 to prevent crop material, not separated from tines 24, from being wrapped around the shaft 20. As shown in FIGS. 4 and 5, an example shield 30 comprises a body 32 having first and second ends 34 and 36 oppositely disposed from one another. An end surface 38 is positioned at the first end 34 of the body 32. End surface 38 faces the shaft 20 (see FIG. 6) and may have a concave radius of curvature 40 complementary to the shaft.

Figure 6:
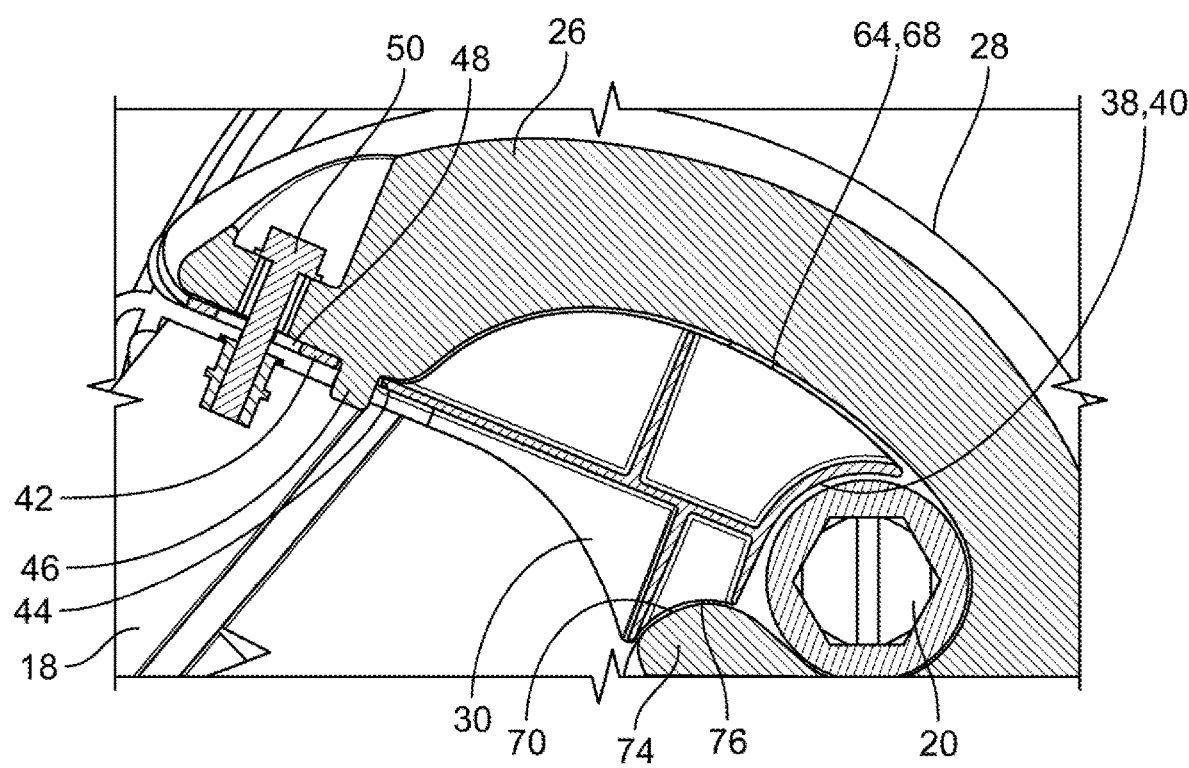
FIG. 6 is a sectional view of an example shield according to the invention mounted on a rotary conveyor.
Figure 7:
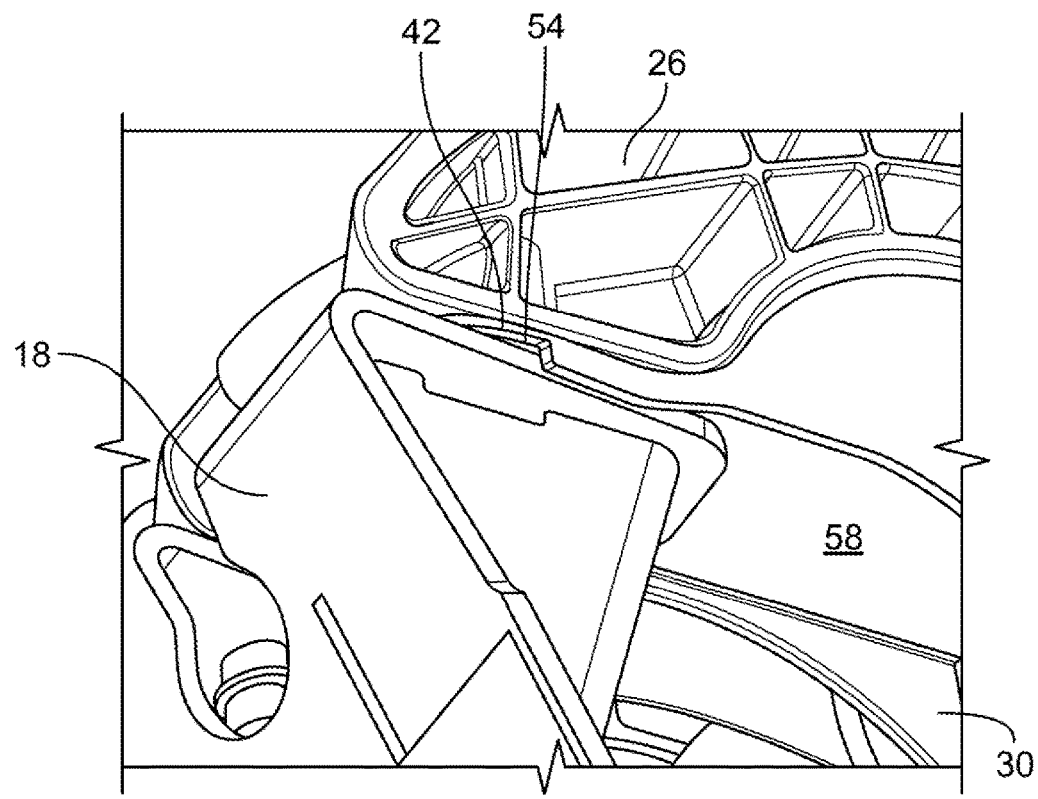
FIG. 7 is an isometric view of a portion of the rotary conveyor shown in FIG. 1 on an enlarged scale.

A lug 42 is positioned at the second end 36 of body 32. In this example, lug 42 extends substantially perpendicularly to the end surface 38 and attaches to the housing 18 (see FIG. 3). Attachment of lug 42 to housing 18 is shown in detail in FIG. 6, and is conveniently effected by positioning it between the stripper finger 26 and the housing 18. Lug 42 may define a hole 44 (see also FIGS. 4 and 5) adapted to receive a locating pin 46 extending from the stripper finger 26 or the housing. Lug 42 may also define a second hole 48 which receives a fastener 50 for attaching the stripper finger 26 and the body 32 to the housing 18. As shown in FIGS. 5 and 7, lug 42 may further comprise first and second skirts 52 and 54. Skirts 52 and 54 are positioned on opposite sides of the lug 42 and extend transversely to it. The skirts 52 and 54 are spaced apart so as to engage portions of the housing and assist in positioning and orienting the shields 30 upon assembly.

As shown in FIGS. 4 and 5, shield 30 comprises first and second side surfaces 56 and 58 positioned on opposite sides of the body 32. The side surfaces 56 and 58 extend between the end surface 38 and the lug 42 and in this example are spaced apart from one another a distance 60 that is substantially equal to a width 62 of the stripper finger 26 (see FIG. 3). This side surface spacing 60 permits the shield 30 to effectively protect the shaft 20 from crop material. Further to that end, the first and second side surface 56 and 58 may have respective first and second edges 64 and 66. As shown in FIGS. 3 and 6, edges 64 and 66 face the stripper finger 26, and it is advantageous if the edges 64 and 66 have a shape 68 which is matched to the shape of the stripper finger. In this example embodiment, the shape 68 has a convex curvature which is complementary to the concave curvature of the stripper finger 26.

As shown in FIGS. 4 and 5, the first and second side surfaces 56 and 58 of shield 30 may further comprise respective first and second ventral edges 70 and 72. As shown in FIGS. 3 and 6, the first and second ventral edges 70 and 72 are positioned in facing relation with an end 74 of stripper finger 26 and advantageously have a shape 76 matched to a shape of the end 74 of the stripper finger 26. In this example embodiment the shape 76 has a concave curvature which is complementary to the convex curvature of the end 74 of the stripper finger 26.

It is expected that harvesters having rotary conveyors using shields according to the invention will operate more reliably and efficiently by avoiding the adverse effects of crop material wrapping around the conveyor shaft.

What is claimed is:

1. A shield mountable on a rotary conveyor and positionable between a stripper finger and a shaft thereof, said shield comprising:

a body having first and second ends oppositely disposed;

an end surface positioned at said first end of said body, said end surface being positionable in facing relation to said shaft;
a lug positioned at said second end of said body, said lug being attachable to said rotary conveyor for retention of said shield thereto;
first and second side surfaces positioned on opposite sides of said body and extending between said end surface and said lug, the shield configured for having an absence of a hinged connection with the stripper finger about an axis parallel with a longitudinal axis of the shaft.

2. The shield according to claim 1, wherein said lug is positionable between said stripper finger and said rotary conveyor.

3. The shield according to claim 1, wherein said end surface has a concave radius of curvature configured for facing said shaft.

4. The shield according to claim 1, wherein said lug extends substantially perpendicularly to said end surface.

5. The shield according to claim 2, wherein said lug defines at least one hole adapted to receive a locating pin extending from one of said stripper fingers or said portion of said rotary conveyor.

6. The shield according to claim 2, wherein said lug defines at least one hole adapted to receive a fastener for attaching said body to said portion of said rotary conveyor.

7. The shield according to claim 1, wherein said lug further comprises first and second skirts positioned in spaced relation on opposite sides of said lug, said first and second skirts extending transversely to said lug.

8. The shield according to claim 1, wherein said first and second side surfaces are spaced apart from one another a distance that is substantially equal to a width of said stripper finger.

9. The shield according to claim 1, wherein said first and second side surfaces have respective first and second edges configured for facing said stripper finger, said first and second edges each having a shape configured for matching to a shape of said stripper finger.

10. The shield according to claim 9, wherein said shapes of said first and second edges comprise a convex curvature.

11. The shield according to claim 1, wherein said first and second sides further comprise respective first and second ventral edges positionable in facing relation with an end of said stripper finger.

12. The shield according to claim 11, wherein said first and second ventral edges have a shape configured for matching to a shape of said end of said stripper finger.

13. The shield according to claim 12, wherein said shape of said first and second ventral edges comprises a concave curvature.

14. A rotary conveyor, said rotary conveyor comprising:
a housing;
a shaft mounted on said housing for rotation about a longitudinal axis of said shaft;
a plurality of tines mounted on said shaft in spaced relation to one another;
a plurality of stripper fingers mounted on said housing in spaced relation to one another, each said tine being positioned between two said stripper fingers;
at least one shield, said at least one shield being positioned between one of said stripper fingers and said shaft and having an absence of a hinged connection with any of said stripper fingers about an axis parallel with said longitudinal axis of said shaft, said at least one shield comprising:

a body having first and second ends oppositely disposed;
an end surface positioned at said first end of said body, said end surface facing said shaft;
a lug positioned at said second end of said body, said lug being attached to said housing;
first and second side surfaces positioned on opposite sides of said body and extending between said end surface and said lug.

15. The rotary conveyor according to claim 14, wherein said lug is positioned between said one stripper finger and said housing.

16. The rotary conveyor according to claim 14, wherein said end surface has a concave radius of curvature facing said shaft.

17. The rotary conveyor according to claim 14, wherein said lug extends substantially perpendicularly to said end surface.

18. The rotary conveyor according to claim 15, wherein said lug defines at least one hole adapted to receive a locating pin extending from said one stripper finger or said housing.

19. The rotary conveyor according to claim 15, wherein said lug defines at least one hole adapted to receive a fastener for attaching said body to said housing.

20. The rotary conveyor according to claim 14, wherein said lug further comprises first and second skirts positioned in spaced relation on opposite sides of said lug, said first and second skirts extending transversely to said lug.

21. The rotary conveyor according to claim 14, wherein said first and second side surfaces are spaced apart from one another a distance that is substantially equal to a width of said one stripper finger.

22. The rotary conveyor according to claim 14, wherein said first and second side surfaces have respective first and second edges facing said one stripper finger, said first and second edges each having a shape matched to a shape of said one stripper finger.

23. The rotary conveyor according to claim 22, wherein said shapes of said first and second edges comprise a convex curvature.

24. The rotary conveyor according to claim 14, wherein said first and second sides further comprise respective first and second ventral edges positioned in facing relation with an end of said one stripper finger.

25. The rotary conveyor according to claim 24, wherein said first and second ventral edges have a shape matched to a shape of said end of said one stripper finger.

26. The rotary conveyor according to claim 25, wherein said shape of said first and second ventral edges comprises a concave curvature.

27. The rotary conveyor according to claim 14, further comprising a plurality of said shields, each said shield being positioned between a respective one of said stripper fingers and said shaft.

28. A harvester, said harvester comprising:
a rotary conveyor comprising:
a housing;
a shaft mounted on said housing for rotation about a longitudinal axis of said shaft;
a plurality of tines mounted on said shaft in spaced relation to one another;
a plurality of stripper fingers mounted on said housing in spaced relation to one another, each said tine being positioned between two said stripper fingers;
at least one shield, said at least one shield being positioned between one of said stripper fingers and said shaft and having an absence of a hinged connection with any of said stripper fingers about an axis parallel with said longitudinal axis of said shaft, said at least one shield comprising:

a body having first and second ends oppositely disposed;

an end surface positioned at said first end of said body, said end surface facing said shaft;

a lug positioned at said second end of said body, said lug being attached to said housing;

first and second side surfaces positioned on opposite sides of said body and extending between said end surface and said lug.

29. The harvester according to claim 28, wherein said lug is positioned between said one stripper finger and said housing.

30. The harvester according to claim 28, wherein said end surface has a concave radius of curvature facing said shaft.

31. The harvester according to claim 28, wherein said lug extends substantially perpendicularly to said end surface.

32. The harvester according to claim 29, wherein said lug defines at least one hole adapted to receive a locating pin extending from said one stripper finger or said housing.

33. The harvester according to claim 29, wherein said lug defines at least one hole adapted to receive a fastener for attaching said body to said housing.

34. The harvester according to claim 28, wherein said lug further comprises first and second skirts positioned in spaced relation on opposite sides of said lug, said first and second skirts extending transversely to said lug.

35. The harvester according to claim 28, wherein said first and second side surfaces are spaced apart from one another a distance that is substantially equal to a width of said one stripper finger.

36. The harvester according to claim 28, wherein said first and second side surfaces have respective first and second edges facing said one stripper finger, said first and second edges each having a shape matched to a shape of said one stripper finger.

37. The harvester according to claim 28, wherein said shapes of said first and second edges comprise a convex curvature.

38. The harvester according to claim 28, wherein said first and second sides further comprise respective first and second ventral edges positioned in facing relation with an end of said one stripper finger.

39. The harvester according to claim 38, wherein said first and second ventral edges have a shape matched to a shape of said end of said one stripper finger.

40. The harvester according to claim 39, wherein said shape of said first and second ventral edges comprises a concave curvature.

41. The harvester according to claim 28, further comprising a plurality of said shields, each said shield being positioned between a respective one of said stripper fingers and said shaft.

42. The harvester according to claim 28, wherein said harvester comprises a baler.

* * * * *